US009247519B2

(12) United States Patent
Junhyo et al.

(10) Patent No.: US 9,247,519 B2
(45) Date of Patent: Jan. 26, 2016

(54) METHOD AND APPARATUS FOR OBTAINING INFORMATION OF USER EQUIPMENT

(71) Applicant: Telefonaktiebolaget L M Ericsson (publ), Stockholm (SE)

(72) Inventors: Shin Junhyo, Seoul (KR); Kwon Kiyul, Gyeonggi-do (KR); Kang Wonseok, Gyeonggi-do (KR)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 230 days.

(21) Appl. No.: 13/872,026

(22) Filed: Apr. 26, 2013

(65) Prior Publication Data

US 2014/0323147 A1  Oct. 30, 2014

(51) Int. Cl.
*H04W 64/00* (2009.01)
(52) U.S. Cl.
CPC .................... *H04W 64/00* (2013.01)
(58) Field of Classification Search
CPC .... H04B 7/2606; H04W 88/04; H04W 16/26; H04W 64/00
USPC ...................................... 455/11.1
See application file for complete search history.

(56) References Cited

U.S. PATENT DOCUMENTS

| 2005/0153712 | A1  | 7/2005 | Osaka et al. |
| 2006/0088023 | A1* | 4/2006 | Muller .......................... 370/350 |
| 2009/0191891 | A1* | 7/2009 | Ma et al. ..................... 455/456.1 |
| 2014/0066115 | A1* | 3/2014 | Sanders ....................... 455/507 |

FOREIGN PATENT DOCUMENTS

| EP | 1448008 | 8/2004 |
| WO | WO-2013/028197 | 2/2013 |

OTHER PUBLICATIONS

International Search Report and Written Opinion, Application No. PCT/SE2014/050467, dated Sep. 1, 2014, 13 pages.

* cited by examiner

*Primary Examiner* — Marisol Figueroa
(74) *Attorney, Agent, or Firm* — Nicholson De Vos Webster & Elliott, LLP (57) ABSTRACT

A method for determining a position of a user equipment includes: receiving, by a location server, time difference information for the user equipment from a base station, the time difference information including a difference between a received timing of an uplink frame from the user equipment at the base station and a transmit timing of a downlink frame to the user equipment at the base station; and identifying, by the location server, a serving remote unit among a plurality of remote units, the serving remote unit communicating with the user equipment by using the time difference information and a unique delay that corresponds to each of the remote units.

19 Claims, 9 Drawing Sheets

METHOD AND APPARATUS FOR OBTAINING INFORMATION OF USER EQUIPMENT

TECHNICAL FIELD

The present disclosure relates to a method and apparatus for obtaining information of a user equipment, and more particularly, to a method and apparatus for determining a position of a user equipment within indoor environment.

BACKGROUND

For users staying in indoor environment, in-building mobile communications services should be available to effectively cover and connect different indoor public places. Among the available in-building mobile communications services, one of the fastest growing services is an Indoor Positioning Solution (IPS). The IPS is primarily driven by two major requirements—emergency services and commercial applications. The emergency services should be able to provide locations of emergency callers with considerable degrees of accuracy and reliability. The commercial applications should be able to perform a fast and accurate positioning for a wide variety of commercial services, such as indoor maps, location based advertising and social network services.

In outdoor environment, sufficient location signals such as Global Navigation Satellite System (GNSS) signals are provided to determine a position of a mobile device. On the other hand, the indoor environment is subjected to higher interference and penetration loss of Radio Frequency (RF) signals than the outdoor environment. In some cases, even the best assisted GNSS signal does not reach some areas in the indoor environment.

As indoor positioning methods without using the GNSS signals, methods using Bluetooth or Wi-Fi technology may be used. However, in the method using Bluetooth or Wi-Fi technology, additional equipment should to be installed at both the network-side and the handset-side in order to determine positions of legacy mobile devices which do not support Bluetooth or Wi-Fi technology.

Alternatively, an actual indoor mobile communication system may be implemented using an indoor repeater system, where a macro-cell's coverage is divided into a plurality of repeated cells. Here, a remote unit is assigned to each of the repeated cells to provide the in-building mobile communications services in the repeated cells. The indoor repeater can increase the cell capacity of the mobile cellular system in the indoor environment. However, the indoor repeater system may not be suitable for the emergency services and the commercial applications for the following reasons.

First, signals in the indoor repeater system are subjected to a high signal loss, as described above. Accordingly, it is hard for user equipment in the indoor repeater system to acquire GNSS signals or RF signals strong enough to perform a position determination from satellites or neighboring base stations.

Second, multiple remote units in one macro cell simulcast signals from the same base station. As a result, the user equipment is provided with mobile communications services in a single strong macro cell which is connected via the remote units. In this environment, it is hard to use conventional positioning methods such as triangulation or trilateration using signals from multiple base stations.

Third, all remote units provided in one macro cell have the same cell Identification Number (ID). Accordingly, the user equipment or a location server cannot locate from which remote unit a received signal was transmitted.

Fourth, inherent delays in the indoor repeater system result in positioning estimation errors. In comparison with a system where the user equipment is directly connected to the base station, the indoor repeater system has inherent signal delays such as optic delays and processing delays of the remote units. These inherent delays result in positioning estimation errors up to a few kilometers.

SUMMARY

The present disclosure provides a method for determining a position of a user equipment in an indoor repeater system. The example methods includes: a delay-time positioning for identifying a serving remote unit communicating with the user equipment; and a received signal power positioning for estimating a position of the user equipment within a coverage of the serving remote unit.

According to an aspect of the present disclosure, there is provided a method for determining a position of a user equipment including: receiving, by a location server, time difference information for the user equipment from a base station, the time difference information including a difference between a received timing of an uplink frame from the user equipment at the base station and a transmit timing of a downlink frame to the user equipment at the base station; and identifying, by the location server, a serving remote unit among the plurality of remote units, the serving remote unit communicating with the user equipment by using the time difference information and a unique delay that corresponds to each of the remote units.

According to another aspect of the present disclosure, there is provided an apparatus in a repeater system including: a first communication unit configured to perform data transmission and reception with a hub in the repeater system; a second communication unit configured to perform data transmission and reception with a user equipment in the repeater system; a storage configured to store a unique delay corresponding to the apparatus; and a controller configured to add the unique delay stored in the storage to uplink or downlink signals.

According to another aspect of the present disclosure, there is provided an apparatus in a repeater system including: a first communication unit configured to perform data transmission and reception with a base station in the repeater system; a second communication unit configured to perform data transmission and reception with each of a plurality of remote units in the repeater system; a storage configured to store a unique delay corresponding to each of the plurality of the remote units; and a processing unit configured to add the unique delay stored in the storage to uplink or downlink signals.

According to another aspect of the present disclosure, there is provided an apparatus in a repeater system including: one or more processing units configured to manage an overall operation of the apparatus; one or more network interfaces configured to receive time difference information for a user equipment from a base station, the time difference information including a difference between a received timing of an uplink frame from the user equipment at the base station and a transmit timing of a downlink frame to the user equipment at the base station; and a memory configured to store a position determination engine configured to identify a serving remote unit among a plurality of remote units, the serving remote unit communicating with the user equipment by using the time difference information and a unique delay that corresponds to each of the remote units.

BRIEF DESCRIPTION OF THE DRAWINGS

The accompanying drawings, which are incorporated in and constitute a part of the specification, illustrate embodiments of the present disclosure, and together with the general description given above and the detailed description of the embodiments given below, serve to explain the principles of the present disclosure.

FIGS. 2A to 2C illustrate timing diagrams for explaining delay-time positioning according to some embodiments of the present disclosure, wherein

DETAILED DESCRIPTION

Reference will now be made in detail to various embodiments, examples of which are illustrated in the accompanying drawings. In the following detailed description, numerous specific details are set forth in order to provide a thorough understanding of the aspects of present disclosure. However, it will be apparent to one of ordinary skill in the art that some aspects of the present disclosure may be practiced without these specific details. In other instances, well-known methods, procedures, systems, and components have not been described in detail so as not to unnecessarily obscure aspects of the various embodiments.

<Configuration of Indoor Repeater System>

Figure 1:
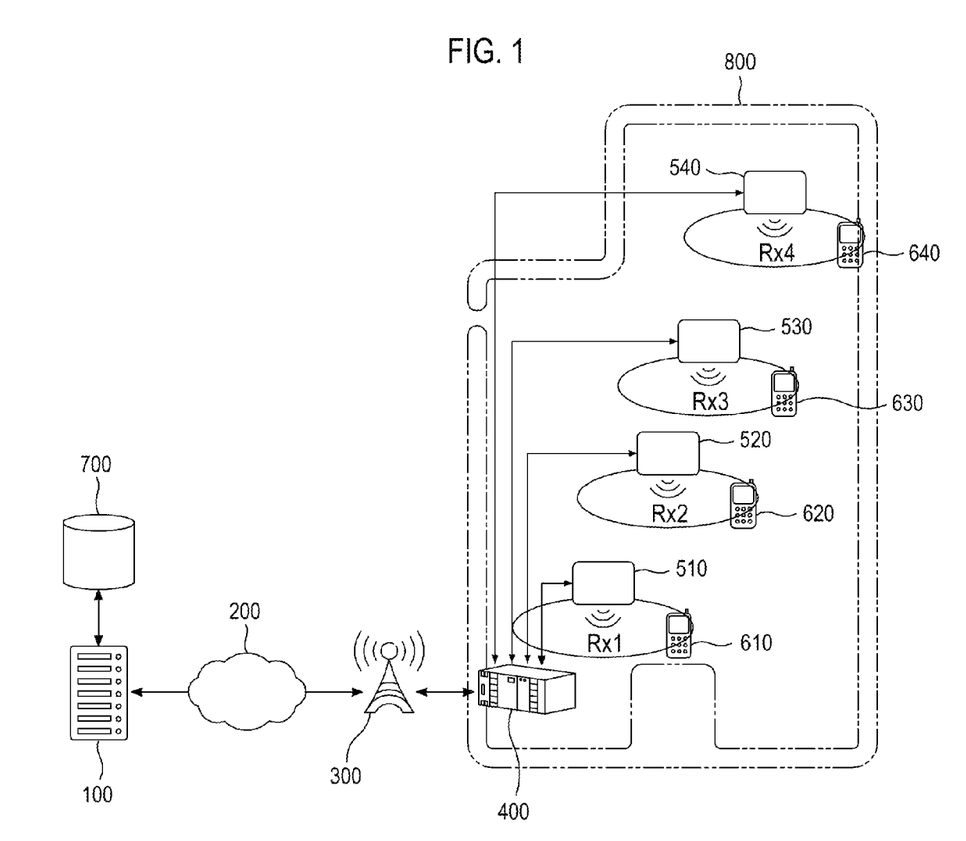
FIG. 1 illustrates a schematic diagram of an illustrative indoor repeater system to which embodiments of the present disclosure can be applied.

FIG. 1 illustrates a block diagram of an indoor repeater system to which embodiments of the present disclosure can be applied.

As shown in FIG. 1, the indoor repeater system includes a location server 100, a network 200, a base station 300, a hub 400 and a plurality of remote units 510 to 540. The location server 100 is coupled to the base station 300 via the network 200, and the base station 300 is coupled to the hub 400. The remote units 510 to 540 are provided in an indoor environment such as a building 800 and coupled to the hub 400 through communication lines such as optical lines. Cell coverage of the base station 300 in the building 800 is divided into a plurality of repeated cells as indicated by circles in FIG. 1 and each of the remote units 510 to 540 covers corresponding one of the repeated cells. Each of user equipment 610 to 640 residing in the building 800 communicates with any one of the remote units 510 to 540, for example, via an air interface. In the example of FIG. 1, the user equipment 610, 620, 630 and 640 communicate with the remote units 510, 520, 530 and 540, respectively. In addition, the location server 100 may be coupled to a database 700.

The indoor repeater system may be implemented using any suitable communication methods such as a Code Division Multiple Access (CDMA) system, a Global System for Mobile Communications (GSM) system, Wideband CDMA (WCDMA) system, Long Term Evolution (LTE) system, LTE Advanced system, etc.

Hereinafter, description will be made to some embodiments of a procedure for determining a position of target user equipment (e.g., one of the user equipment 610 to 640) in an indoor repeater system where the hub 400 are coupled to the remote units 510 to 540 via optical lines. However, it is apparent to those skilled in the art that the hub 400 and the remote units 510 to 540 may be coupled via any other suitable medium such as coaxial cables or air interface. The procedure for determining the position of target user equipment includes "Delay-time Positioning" and "Received Signal Power Positioning", which will be described in detail below.

<Delay-Time Positioning>

In one embodiment, the procedure for determining a position of a target user equipment in an indoor repeater system includes a delay-time positioning operation to identify a serving remote unit (one of the remote units 510 to 540) communicating with the target user equipment, and a received signal power positioning operation to estimate a position of the target user equipment with respect to the serving remote unit, for example, a distance between the serving remote unit and the user equipment. Below, the delay-time positioning operation will be described with reference to FIGS. 1 and 2A to 2C.

Figure 2A:
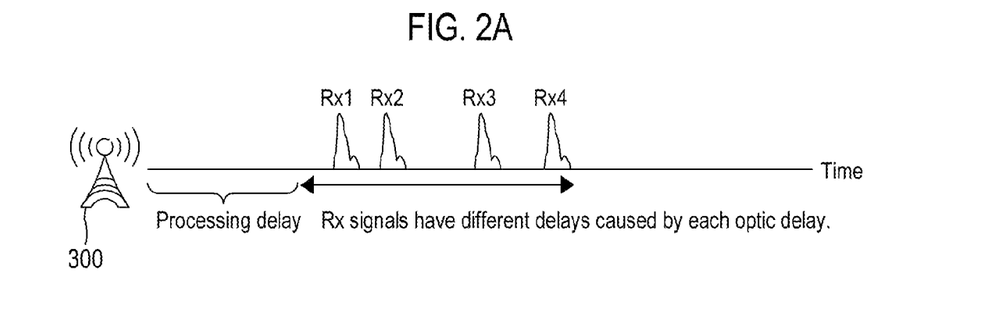
FIG. 2A illustrates signal delays in the indoor repeater system.

FIG. 2A illustrates a timing diagram showing signal delays in the indoor repeater system according to one embodiment of the present disclosure. In the indoor repeater system shown in FIG. 1, the base station 300 is coupled to the user equipment 610 to 640 via the hub 400 and the remote units 510 to 540, as described above. Accordingly, a period of signal transmission from and to the base station 300 to the user equipment 610 to 640 includes three types of delays including a processing delay $D_{PROC}$, an optic delay $D_{OPTIC}$ and an air delay $D_{AIR}$.

The processing delay $D_{PROC}$ can be expressed as Equation 1:

$$D_{PROC} = D_{HUB} + D_{RU}, \quad \text{Equation 1}$$

wherein $D_{HUB}$ denotes a processing delay of the hub 400 and $D_{RU}$ denotes a processing delay of each of the remote units 510 to 540. The processing delays $D_{HUB}$ and $D_{RU}$ are caused due to various processes, such as signal dividing and combining processes and A/D (analog-to-digital) and D/A (digital-to-analog) conversion, carried out by the hub 400 and each of the remote units 510 to 540. The processing delay $D_{RU}$ may be set to be a single constant value for all the remote units 510 to 540 if the remote units 510 to 540 have the same configuration.

The optic delay $D_{OPTIC}$ is generated in proportional to a length of the optical lines (hereinafter "optical length") between the hub 400 and each of the remote units 510 to 540. Accordingly, each of the remote units 510 to 540 may have different optic delays $D_{OPTIC}$. If the optical length is 200 m, the optic delay $D_{OPTIC}$ can be expressed as Equation 2:

$$D_{OPTIC} = 200 \text{ m}/(2*10^8 \text{ m/s}) = 1 \text{ us. (one way delay)} \quad \text{Equation 2}$$

The air delay $D_{AIR}$ is generated in proportional to a distance between each of the remote units 510 to 540 and the user equipment 610 to 640 connected to the remote units 510 to 540. Accordingly, each of the user equipment 610 to 640 may have different air delay $D_{AIR}$. If a radius of each of the repeated cells is 15 m, the air delay $D_{AIR}$ is within 0.05 µs from Equation 3:

$$D_{AIR}=15\ m/(3*10^8\ m/s)=0.05\ \mu s.\ (one\ way) \quad \text{Equation 3}$$

Therefore, the overall delay $D_{ALL}$ can be expressed as Equation 4:

$$D_{ALL}=D_{PROC}+D_{OPTIC}+D_{AIR}. \quad \text{Equation 4}$$

Because the remote units 510 to 540 receive signals transmitted from the base station 300 with different optic delays $D_{OPTIC}$, the remote units 510, 520, 530 and 540 transmit signals Rx1, Rx2, Rx3 and Rx4, respectively, at different timings, as shown in FIG. 2A.

The delay-time positioning operation according to the present disclosure identifies the serving remote unit of the target user equipment based on time difference information of the target user equipment and unique delays corresponding to the remote units 510 to 540.

As used herein, the "time difference information" corresponds to signal delays between the base station 300 and the user equipment 610 to 640. In an LTE system, for example, a timing advance $T_{ADV}$ defined in the LTE standards corresponds to the time difference information. The timing advance $T_{ADV}$ as defined in the LTE standards is as follows:

$$T_{ADV}=(eNB\ Rx-Tx\ time\ difference)+(UE\ Rx-Tx\ time\ difference),\ and \quad \text{Type 1:}$$

$$T_{ADV}=eNB\ Rx-Tx\ time\ difference. \quad \text{Type 2:}$$

Since the delay-time positioning operation according to the present disclosure uses the time difference information, the delay-time positioning may not be performed properly if there remains irregularity between the timings of the signals Rx1 to Rx4 due to the different optic delays. Thus, the optic delay alignment needs to be performed to eliminate the irregularity between the timings of the signals Rx1 to Rx4.

Figure 2B:
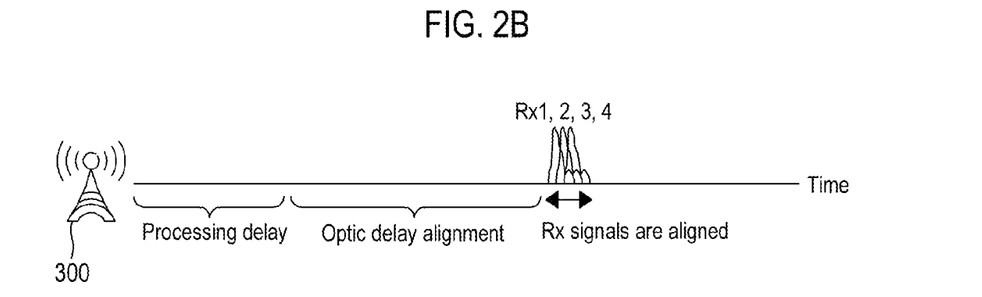
FIG. 2B illustrates signal delays after performing the optic delay alignment.

FIG. 2B illustrates a timing diagrams showing signal delays after performing an optic delay alignment.

In the optic delay alignment operation, the hub 400 measures the optic delay $D_{OPTIC}$ between the hub 400 and each of the remote units 510 to 540. Then, the hub 400 adds an additional delay to downlink signals to be transmitted to each of the remote units 510 to 540. The additional delay is determined so that a sum of the optic delay $D_{OPTIC}$ and the additional delay has a substantially same value for all the remote units 510 to 540 as shown in FIG. 2B. For example, if a radius of each of the repeated cells is 15 m to 20 m, the signals Rx1 to Rx4 may be aligned within 0.1 µs through the optic delay alignment. In some embodiments, the hub 400 may also add the additional delay to uplink signals received from each of the remote units 510 to 540 for the optic delay alignment operation.

In the delay-time positioning operation according to the present disclosure, a unique delay is set for each of the remote units 510 to 540 and each of the remote units 510 to 540 adds, after the optic delay alignment, the unique delay to downlink signals to be transmitted to the user equipment 610 to 640. In some embodiments, each of the remote units 510 to 540 may add the unique delay to uplink signals received from the user equipment 610 to 640. In some other embodiments, the hub 400 may add the unique delays to uplink or downlink signals.

The unique delays may be set and stored in each of the remote units 510 to 540 by a system administrator when the indoor repeater system is installed. Alternatively, the unique delays may be automatically set and stored at each of the remote units 510 to 540 by the hub 400. In any one of the above cases, the unique delays may also be stored at the database 700, which is accessible by the location server 100, along with geographical locations of the remote units 510 to 540.

In some embodiments, a non-negative integer is consecutively assigned to each of the remote units 510 to 540 and the unique delay is set by multiplying a predetermined delay separation time $D_p$ by a non-negative integer.

In order to minimize a position determination error, the delay separation time $D_p$ may be larger than a resolution of the time difference information. In the LTE system, for example, the standard defines that a resolution of the timing advance is 16*Ts, where Ts is the sampling rate of 1/30.72 MHz ($\approx$33 ns). Therefore, the delay separation time $D_p$ is required to have a value higher than 16*Ts (0.52 µs) in the LTE system.

Figure 2C:
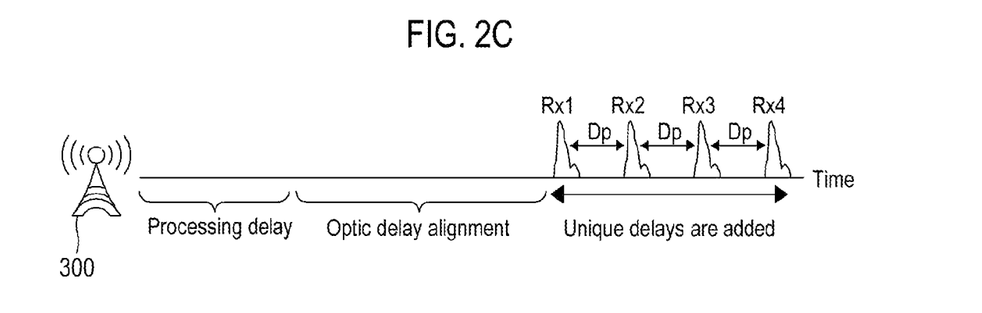
FIG. 2C illustrates signal delays after adding unique delays to signals having been subjected to the optical delay alignment.

FIG. 2C illustrates a timing diagram showing signal delays after adding unique delays to signals having been subjected to the optical delay alignment. In FIG. 2C, 0, $D_p$, $2D_p$ and $3D_p$ are set as unique delays of the remote units 510, 520, 530 and 540, respectively. In this case, the location server 100 identifies the serving remote unit communicating with the target user equipment by comparing the time difference information of the target user equipment and the unique delays based on the following table which may be stored in the database 700.

| Time Difference Information $T_D$ | Serving Remote Unit |
|---|---|
| $0 < T_D \leq D_p$ | 510 |
| $D_p < T_D \leq 2D_p$ | 520 |
| $2D_p < T_D \leq 3D_p$ | 530 |
| $3D_p < T_D \leq 4D_p$ | 540 |

<Received Signal Power Positioning>

Through the delay-time positioning as described above, the location server 100 can identify the serving remote unit of the target user equipment. As a result, the accuracy of identifying a location the target user equipment is reduced within coverage of the serving remote unit. Thus, the receive signal power positioning is performed in order to accurately locate the target user equipment within the coverage of the serving remote unit.

In a mobile communications system, a user equipment may report a measurement value for a signal strength of a reference signal from a base station. Further, a reported measurement value is used to estimate a position of the user equipment with respect to the base station, for example, a distance between the user equipment and the base station. In an LTE system, for example, the measured and reported value is referred to as Reference Signal Received Power (RSRP) or Reference Signal Reported Quality (RSRQ). If the user equipment moves closer to the base station, the RSRP or RSRQ becomes higher. On the other hand, if the user equipment moves farther from the base station, the RSRP or RSRQ becomes lower.

In the indoor repeater system shown in FIG. 1, each of the user equipment 610 to 640 measures received signal power of a reference signal transmitted by the remote units 510 to 540, and report the measured received signal power to the base station 300 via the hub 400 and the remote units 510 to 540. The received signal power may be at least one of power and quality of the reference signal transmitted by the serving remote unit. Thus, the location server 100 can estimate a position of the target user equipment with respect to the serving remote unit, for example, the distance from the target user equipment and the serving remote unit based on the received signal power measured by the target user equipment.

<Position Determination>

Hereinafter, a position determination operation according to one embodiment will be described with reference to FIGS. 3A and 3B.

Figure 3A:
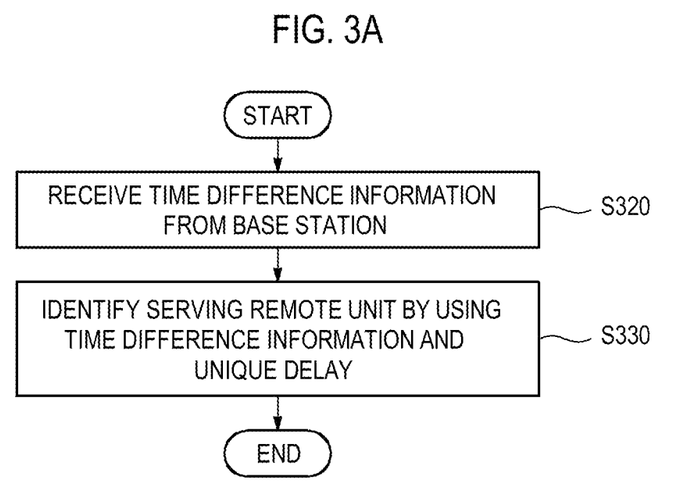
FIGS. 3A and 3B illustrate flowcharts of a position determination method according to one embodiment of the present disclosure.
Figure 3B:
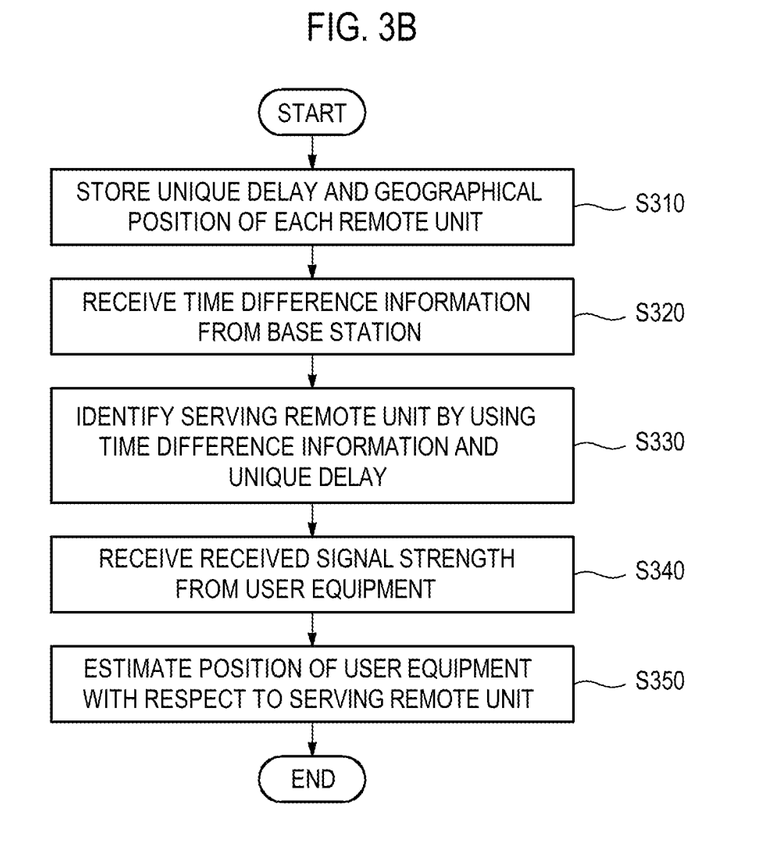

FIGS. 3A and 3B illustrate flowcharts of a position determination method according to one embodiment of the present disclosure. More specifically, FIG. 3A illustrates the "Delay-time Positioning" only, while FIG. 3B further illustrates the "Received Signal Power Positioning" performed after the "Delay-time Positioning".

First, a unique delay is set for each of the remote units 510 to 540 and stored in each of the remote units 510 to 540 (operation S310). In some embodiments, a non-negative integer is consecutively assigned to each of the remote units 510 to 540, and the unique delay is set by multiplying a predetermined delay separation time by a non-negative integer. The delay separation time may be larger than a resolution of the time difference information, which will be described in detail later.

As described above, the operation S310 may be performed manually by the system administrator or automatically by the hub 400. Further, the unique delays may be also stored in the database 700 in the operation S310. In addition, the hub 400 measures the optic delay between the hub 400 and each of the remote units 510 to 540 and determines the additional delay for use in the optic delay alignment.

During data transmission between the base station 300 and the user equipment 610 to 640 after the operation S310, the hub 400 adds the additional delay to uplink or downlink signals to perform the optical delay alignment and each of the remote units 510 to 540 adds the unique delay to uplink or downlink signals. Detailed configuration of the hub 400 and the remote units 510 to 540 will be described below with reference to FIGS. 4 and 5.

Figure 4:
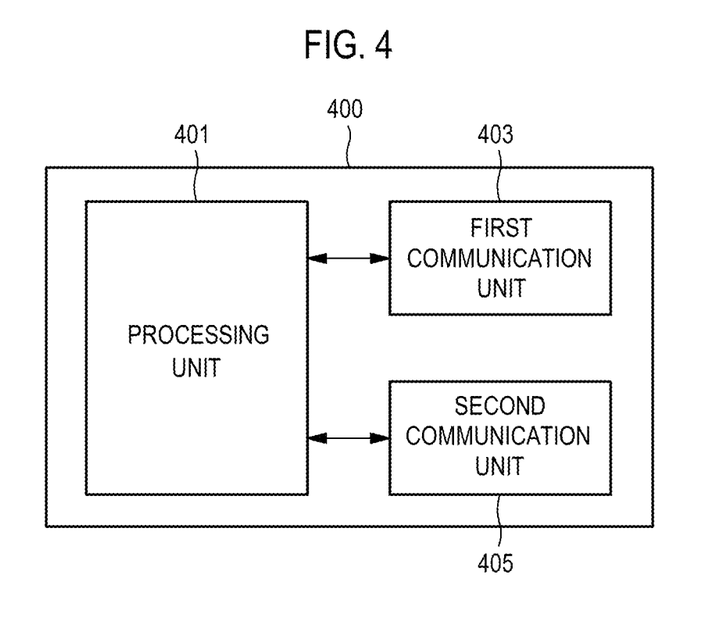
FIG. 4 illustrates a block diagram of the hub shown in FIG. 1 according to one embodiment of the present disclosure.

FIG. 4 illustrates a block diagram of the hub 400 shown in FIG. 1 according to one embodiment.

As shown in FIG. 4, the hub 400 includes a processing unit 401, a first communication unit 403 and a second communication unit 405. The first communication unit 403 is configured to perform data transmission and reception in communication with the base station 300 while the second communication unit 405 is configured to perform data transmission and reception in communication with each of the remote units 510 to 540. The processing unit 401 is configured to control the entire operation of the hub 400 and performs the optic delay alignment. In the optic delay alignment operation, the processing unit 401 measures the optic delay between the hub 400 and each of the remote units 510 to 540 and aligns the measured delays by adding an additional delay to uplink or downlink signals received from or transmitted to each of the remote units 510 to 540, so that a sum of the delay and the additional delay has a substantially same value for all the remote units 510 to 540.

Figure 5:
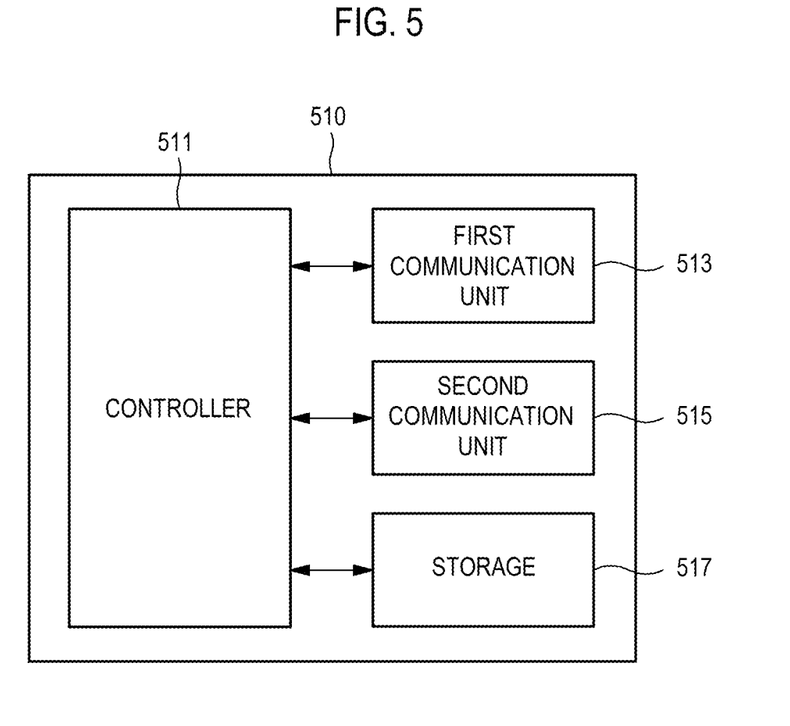
FIG. 5 illustrates a block diagram of the remote unit shown in FIG. 1 according to one embodiment of the present disclosure.

FIG. 5 illustrates a block diagram of the remote unit 510 shown in FIG. 1 according to one embodiment. Other remote units 520 to 540 may have the same configuration to that of the remote unit 510.

As shown in FIG. 5, in one embodiment, the remote unit 510 includes a controller 511, a first communication unit 513, a second communication unit 515 and a storage 517. The first communication unit 513 is configured to perform data transmission and reception in communication with the hub 400 while the second communication unit 515 is configured to perform data transmission and reception in communication with the user equipment 610 to 640. The storage 517 is configured to store the unique delay set for each of the remote units 510 to 540. The controller 511 is configured to control the entire operation of the remote unit 510. In addition, the controller 511 adds the unique delay stored in the storage 517 to uplink or downlink signals.

Referring back to FIGS. 3A and 3B, the location server 100 receives the time difference information for the user equipment 610 to 640 from the base station 300 (operation S320). In the present disclosure, one of the user equipment 610 to 640 may be a target user equipment of a position determination. The time difference information may include a difference between a received timing of an uplink frame from the target user equipment at the base station 300 and a transmit timing of a downlink frame to the target user equipment at the base station 300.

After the operation S320, the location server 100 identifies the serving remote unit communicating with the target user equipment by using the time difference information and the unique delays of the remote units 510 to 540 (operation S330).

In operation step S330, if the time difference information is larger than a first unique delay and equal to or smaller than a second unique delay, the location server 100 determines a remote unit with the first unique delay among the remote units 510 to 540 as the serving remote unit, where the first unique delay is determined by multiplying the delay separation time by a first non-negative integer and the second unique delay is determined by multiplying the delay separation time by a second non-negative integer. In order to minimize a position determination error, the delay separation time may be larger than a resolution of the time difference information.

After identifying the serving remote unit of the target user equipment in the operation S330, the location server 100 receives a received signal strength from the target user equipment (operation S340). The received signal strength is measured based on at least one of power and quality of a reference signal transmitted by the serving remote unit, and the received signal strength is measured by the target user equipment. In the LTE system, the received signal strength may be at least one of RSRP or RSRQ as described above.

After receiving the received signal strength from the target user equipment in the operation S340, the location server 100 estimates the position of the target user equipment with respect to the serving remote unit, for example, the distance between the serving remote unit and the target user equipment based on the received signal strength (operation S350).

According to the above-described embodiments of the present disclosure, a serving remote unit communicating with a target user equipment within an indoor repeater system can be identified, and a position of the target user equipment with respect to the serving remote unit, for example, a distance between the target user equipment and the serving remote unit can be accurately estimated. Accordingly, the position of the target user equipment can be determined with a sufficient accuracy to meet the requirements for various applications such as the emergency services and commercial applications.

Figure 6:
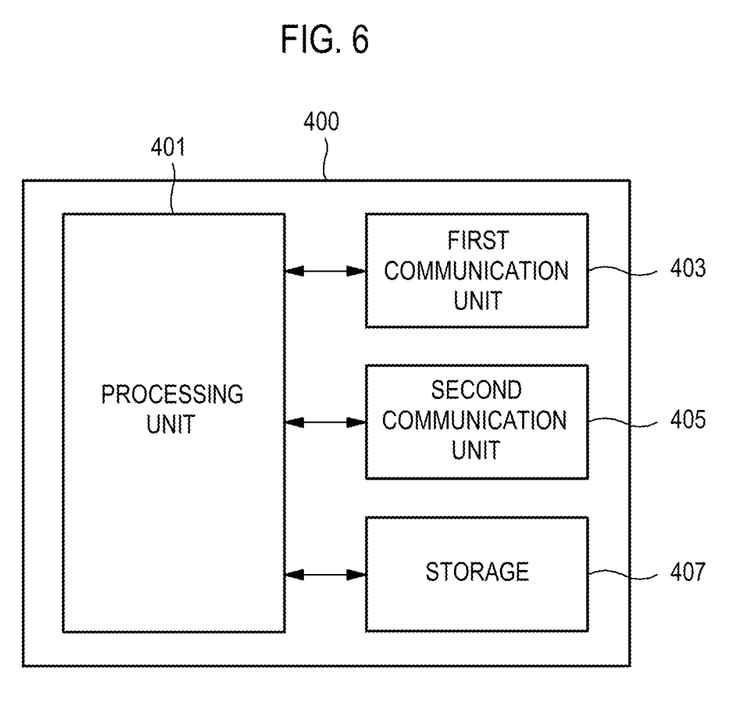
FIG. 6 illustrates a block diagram of the hub shown in FIG. 1 according to another embodiment of the present disclosure.

FIG. 6 illustrates a block diagram of the hub 400 shown in FIG. 1 according to another embodiment. The same or similar elements as the embodiment shown in FIG. 6 are denoted by the same reference numerals as the above-described embodiment shown in FIG. 4. The explanation of some of the same or similar elements as the above-described embodiment will not be repeated.

As shown in FIG. 6, the hub 400 includes a processing unit 401, a first communication unit 403 and a second communication unit 405, which are the same or similar elements in the embodiment shown in FIG. 4. Similarly to the embodiment shown in FIG. 4, the first communication unit 403 is configured to perform data transmission and reception in communication with the base station 300 while the second communication unit 405 is configured to perform data transmission and reception in communication with each of the remote units 510 to 540. The processing unit 401 is configured to control the entire operation of the hub 400 and performs the optic delay alignment.

In the embodiment shown in FIG. 6, the hub 400 further includes a storage 407, and the processing unit 401 is further configured to add the unique delay stored in the storage 407 to uplink or downlink signals. In this embodiment, each of the remote units 510 to 540 may not add the unique delay to uplink or downlink signals.

Figure 7:
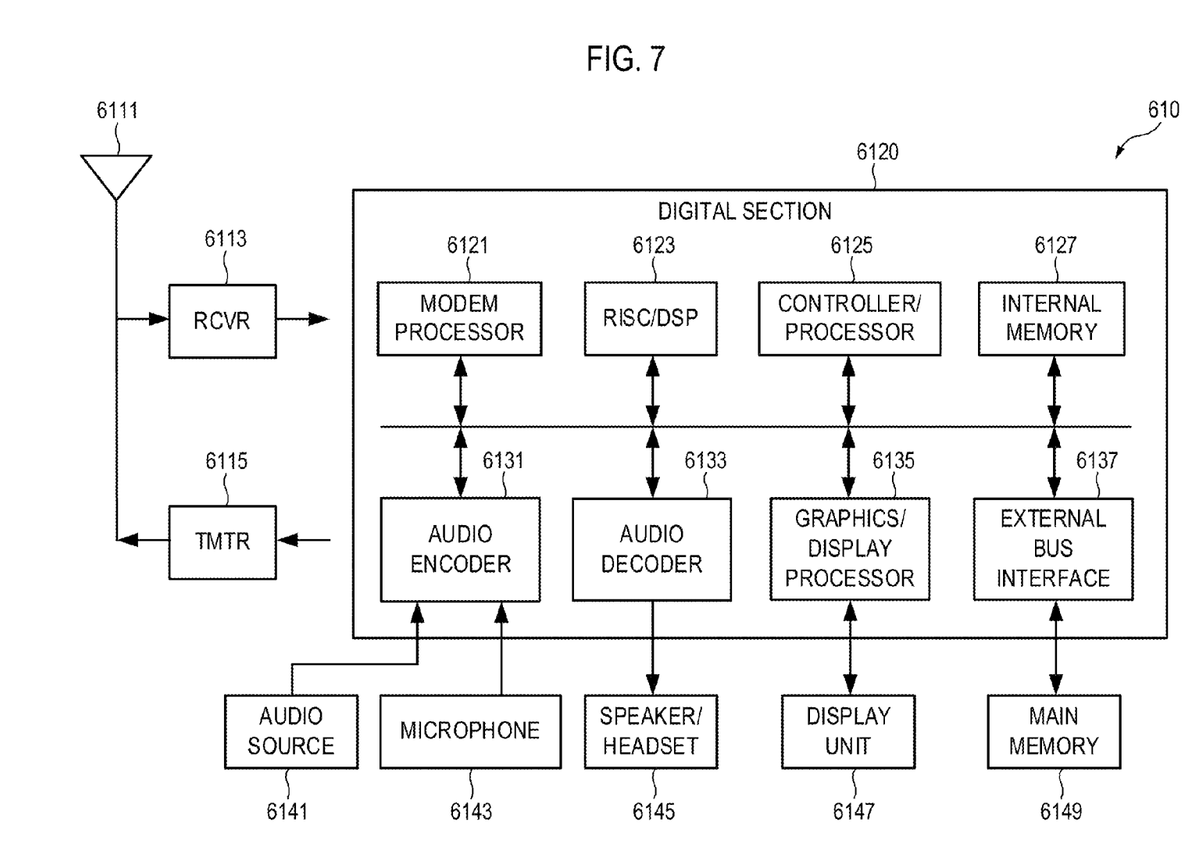
FIG. 7 illustrates a block diagram of the user equipment shown in FIG. 1 according to some embodiments of the present disclosure.

FIG. 7 illustrates a block diagram of the user equipment 610 in a wireless communication system in which the methods and apparatus of the present disclosure for obtaining information of a user equipment may be implemented according to some embodiments. The user equipment 610 may be a mobile device such as a cellular phone, a terminal, a handset, a personal digital assistant (PDA), a wireless modem, a cordless phone, a tablet, and so on. The wireless communication system may be a Code Division Multiple Access (CDMA) system, a Global System for Mobile Communications (GSM) system, a Wideband CDMA (WCDMA) system, a Long Term Evolution (LTE) system, a LTE Advanced system, and so on.

The user equipment 610 may be capable of providing bidirectional communication via a receive path and a transmit path. On the receive path, signals transmitted by base stations are received by an antenna 6111 and are provided to a receiver (RCVR) 6113. The receiver 6113 conditions and digitizes the received signal and provides the conditioned and digitized signal to a digital section 6120 for further processing. On the transmit path, a transmitter (TMTR) receives data to be transmitted from a digital section 6120, processes and conditions the data, and generates a modulated signal, which is transmitted via the antenna 6111 to the base stations. The receiver 6113 and the transmitter 6115 is part of a transceiver that supports CDMA, GSM, WCDMA, LTE, LTE Advanced, and so on.

The digital section 6120 includes various processing, interface, and memory units such as, for example, a modem processor 6121, a reduced instruction set computer/digital signal processor (RISC/DSP) 6123, a controller/processor 6125, an internal memory 6127, a generalized audio encoder 6131, a generalized audio decoder 6133, a graphics/display processor 6135, and/or an external bus interface (EBI) 6137. The modem processor 6121 performs processing for data transmission and reception, e.g., encoding, modulation, demodulation, and decoding. The RISC/DSP 6123 performs general and specialized processing for the user equipment 610. The controller/processor 6125 controls the operation of various processing and interface units within the digital section 6120. The internal memory 6127 stores data and/or instructions for various units within the digital section 6120.

The generalized audio encoder 6131 performs encoding for input signals from an audio source 6141, a microphone 6143, and so on. The generalized audio decoder 6133 performs decoding for coded audio data and provides output signals to a speaker/headset 6145. It should be noted that the generalized audio encoder 6131 and the generalized audio decoder 6133 are not necessarily required for interface with the audio source, the microphone 6143 and the speaker/headset 6145, and thus are not shown in the user equipment 610. The graphics/display processor 6135 performs processing for graphics, videos, images, and texts, which is presented to a display unit 6147. The EBI 6137 facilitates transfer of data between the digital section 6120 and a main memory 6149.

The digital section 6120 is implemented with one or more processors, DSPs, microprocessors, RISCs, etc. The digital section 6120 is also fabricated on one or more application specific integrated circuits (ASICs) and/or some other type of integrated circuits (ICs).

In general, any device described herein is indicative of various types of devices, such as a wireless phone, a cellular phone, a laptop computer, a wireless multimedia device, a wireless communication personal computer (PC) card, a PDA, an external or internal modem, a device that communicates through a wireless channel, and so on. A device may have various names, such as access terminal (AT), access unit, subscriber unit, mobile station, client device, mobile unit, mobile phone, mobile, remote station, remote terminal, remote unit, user device, user equipment, handheld device, etc. Any device described herein may have a memory for storing instructions and data, as well as hardware, software, firmware, or combinations thereof.

Figure 8:
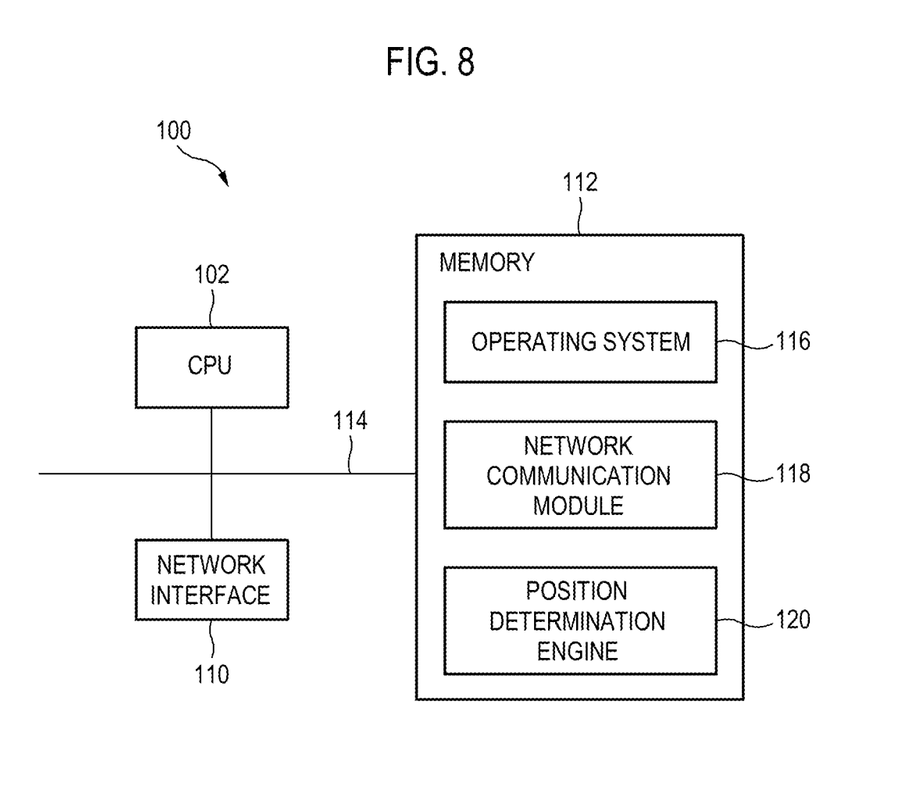
FIG. 8 illustrates a block diagram of the location server shown in FIG. 1 according to some embodiments of the present disclosure.

FIG. 8 is a block diagram illustrating the location server 100, which may be any one of the servers previously described, for obtaining information of a user equipment implemented in accordance with some embodiments. The location server 100 may include one or more processing units (CPU's) 102, one or more network or other communications interfaces 110, a memory 112, and one or more communication buses 114 for interconnecting these components. The location server 100 may also include a user interface (not shown) having a display device and a keyboard.

The memory 112 may be any suitable memory, such as a high-speed random access memory, (e.g., DRAM, SRAM, DDR RAM or other random access solid state memory devices). The memory 112 may include or may alternatively be non-volatile memory (e.g., one or more magnetic disk storage devices, optical disk storage devices, flash memory devices, or other non-volatile solid state storage devices). In some embodiments, the memory 112 may include one or more storage devices remotely located from the CPU(s) 102 and/or remotely located in multiple sites.

Any one of the above memory devices represented by the memory 112 may store any number of modules or programs that corresponds to a set of instructions for performing and/or executing any of the processes, operations, and methods previously described. For example, the memory 112 may include an operating system 116 configured to store instructions that includes procedures for handling various basic system services and for performing hardware dependent tasks. A network communication module 118 of the memory 112 may be used for connecting the location server 100 to other computers via the one or more communication network interfaces 110 (wired or wireless) and one or more communication networks, such as the Internet, other wide area networks, local area networks, metropolitan area networks, and so on. The memory 112 may also include a position determination engine 120 configured to identify a serving remote unit communicating with a target user equipment, and configured to estimate a position of the target user equipment with respect to the serving remote unit, for example, a distance between the serving remote unit and the target user equipment based on the received signal strength. The position determination engine 120 may access a database such as the database 700 configured to store the unique delay and a geographical location of each of the remote units, and may identify the serving remote unit by comparing the time difference information of the target user equipment received from the base station 300 with the unique delays stored in the database 700.

It will be appreciated that the above identified modules or programs (i.e., sets of instructions) need not be implemented as separate software programs, procedures or modules, and thus various subsets of these modules may be combined or otherwise re-arranged in various embodiments. Furthermore, the memory 112 may store additional modules and data structures not described above.

The techniques described herein are implemented by various means. For example, these techniques are implemented in hardware, firmware, software, or a combination thereof. It will be further appreciated that the various illustrative logical blocks, modules, circuits, and algorithm steps described in connection with the disclosure herein may be implemented as electronic hardware, computer software, or combinations of both are possible. To clearly illustrate this interchangeability of hardware and software, the various illustrative components, blocks, modules, circuits, and steps have been described above generally in terms of their functionality. Whether such functionality is implemented as hardware or software depends upon the particular application and design constraints imposed on the overall system. The described functionality may be implemented in varying ways for each particular application, but such implementation decisions should not be interpreted as causing a departure from the scope of the present disclosure.

For a hardware implementation, the processing units used to perform the techniques may be implemented within one or more ASICs, DSPs, digital signal processing devices (DSPDs), programmable logic devices (PLDs), field programmable gate arrays (FPGAs), processors, controllers, micro-controllers, microprocessors, electronic devices, other electronic units designed to perform the functions described herein, a computer, or a combination thereof.

If implemented in software, the methods, operations, and processes previously described may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

While certain embodiments have been described, these embodiments have been presented by way of example only, and are not intended to limit the scope of the disclosures. Indeed, the novel methods and apparatuses described herein may be embodied in a variety of other forms; furthermore, various omissions, substitutions and changes in the form of the embodiments described herein may be made without departing from the spirit of the disclosures. The accompanying claims and their equivalents are intended to cover such forms or modifications as would fall within the scope and spirit of the disclosures.

What is claimed is:

1. A method for determining a position of a user equipment, the method comprising:
   receiving, by a location server, time difference information for the user equipment from a base station, the time difference information including a difference between a received timing of an uplink frame from the user equipment at the base station and a transmit timing of a downlink frame to the user equipment at the base station; and
   identifying, by the location server, a serving remote unit among a plurality of remote units, the serving remote unit communicating with the user equipment by using the time difference information and a unique delay that corresponds to the serving remote unit that is different than unique delays of the others of the plurality of remote units, wherein a non-negative integer is assigned to each of the plurality of remote units consecutively, and the unique delay is set for each of the remote units by multiplying a predetermined delay separation time by the non-negative integer assigned to the remote unit, wherein the identifying the serving remote unit includes, if the time difference information is larger than a first unique delay and equal to or smaller than a second unique delay, determining, by the location server, a remote unit with the first unique delay among the plurality of remote units as the serving remote unit, wherein the first unique delay is determined by multiplying the delay separation time by a first non-negative integer and the second unique delay is determined by multiplying the delay separation time by a second non-negative integer.

2. The method of claim 1, wherein the delay separation time is larger than a resolution of the time difference information.

3. The method of claim 1, further comprising:
   measuring, by a hub coupled to the remote units, a delay between the hub and each of the remote units; and
   adding, by the hub, an additional delay to uplink or downlink signals received from or transmitted to each of the remote units so that a sum of the measured delay and the additional delay has a substantially same value for all the remote units.

4. The method of claim 1, further comprising:
   adding, by each of the remote units, the unique delay to uplink or downlink signals.

5. The method of claim 1, further comprising:
   storing, by the location server, the unique delay of each of the remote units along with a geographical location of corresponding one of the remote units in a database.

6. The method of claim 1, further comprising:
   receiving, by the location server, a received signal strength from the user equipment; and
   estimating, by the location server, the position of the user equipment with respect to the serving remote unit based on the received signal strength.

7. The method of claim 6, wherein the received signal strength is measured based on at least one of power and quality of a reference signal transmitted by the serving remote unit, and the received signal strength is measured by the user equipment.

8. An apparatus in a repeater system comprising:
a first communication unit configured to perform data transmission and reception with a hub in the repeater system, wherein the hub is coupled to a plurality of remote units in the repeater system and the apparatus is one of the plurality of the remote units, and wherein the hub includes:
- a first communication unit configured to perform data transmission and reception with a base station in the repeater system,
- a second communication unit configured to perform data transmission and reception with each of the plurality of remote units, and
- a processing unit configured to measure a delay between the hub and each of the remote units, and align the measured delays;

a second communication unit configured to perform data transmission and reception with a user equipment in the repeater system;
a storage configured to store a unique delay corresponding to the apparatus; and
a controller configured to add the unique delay stored in the storage to uplink or downlink signals.

9. The apparatus of claim 8, wherein a non-negative integer is uniquely assigned to the apparatus and the unique delay is set by multiplying a predetermined delay separation time by a non-negative integer.

10. The apparatus of claim 9, wherein the delay separation time is larger than a resolution of time difference information, and the time difference information includes a difference between a received timing of an uplink frame from the user equipment at the base station and a transmit timing of a downlink frame to the user equipment at the base station.

11. The apparatus of claim 8, wherein the processing unit is configure to align the delays by adding an additional delay to uplink or downlink signals received from or transmitted to each of the remote units so that a sum of the delay and the additional delay has a substantially same value for all the remote units.

12. An apparatus in a repeater system comprising:
a first communication unit configured to perform data transmission and reception with a base station in the repeater system;
a second communication unit configured to perform data transmission and reception with each of a plurality of remote units in the repeater system; and
a processing unit configured to:
- add a unique delay corresponding to each of the plurality of the remote units to uplink or downlink signals, and
- measure a delay between the apparatus and each of the remote units, and align the delays by adding an additional delay to uplink or downlink signals received from or transmitted to each of the remote units so that a sum of the delay and the additional delay has a substantially same value for all the remote units.

13. The apparatus of claim 12, wherein a non-negative integer is uniquely assigned to each of the remote units, and the unique delay is set by multiplying a predetermined delay separation time by a non-negative integer.

14. The apparatus of claim 13, wherein the delay separation time is larger than a resolution of time difference information, and the time difference information includes a difference between a received timing of an uplink frame from a user equipment at the base station and a transmit timing of a downlink frame to the user equipment at the base station.

15. The apparatus of claim 12, further comprising:
a storage configured to store the unique delay,
wherein the processing unit is configured to add the unique delay stored in the storage to uplink or downlink signals.

16. A method for determining a position of a user equipment, the method comprising:
receiving, by a location server, time difference information for the user equipment from a base station, the time difference information including a difference between a received timing of an uplink frame from the user equipment at the base station and a transmit timing of a downlink frame to the user equipment at the base station;
identifying, by the location server, a serving remote unit among a plurality of remote units, the serving remote unit communicating with the user equipment by using the time difference information and a unique delay that corresponds to the serving remote unit that is different than unique delays of the others of the plurality of remote units;
measuring, by a hub coupled to the remote units, a delay between the hub and each of the remote units; and
adding, by the hub, an additional delay to uplink or downlink signals received from or transmitted to each of the remote units so that a sum of the measured delay and the additional delay has a substantially same value for all the remote units.

17. The method of claim 16, further comprising:
storing, by the location server, the unique delay of each of the remote units along with a geographical location of corresponding one of the remote units in a database.

18. The method of claim 16, further comprising:
receiving, by the location server, a received signal strength from the user equipment; and
estimating, by the location server, the position of the user equipment with respect to the serving remote unit based on the received signal strength.

19. The method of claim 18, wherein the received signal strength is measured based on at least one of power and quality of a reference signal transmitted by the serving remote unit, and the received signal strength is measured by the user equipment.

* * * * *

UNITED STATES PATENT AND TRADEMARK OFFICE
CERTIFICATE OF CORRECTION

PATENT NO.      : 9,247,519 B2
APPLICATION NO. : 13/872026
DATED           : January 26, 2016
INVENTOR(S)     : Junhyo et al.

Page 1 of 1

It is certified that error appears in the above-identified patent and that said Letters Patent is hereby corrected as shown below:

In The Specification

In Column 4, Line 47, in Equation (1), delete "$D_{PROC}-D_{HUB}+D_{RU}$," and insert -- $D_{PROC}=D_{HUB}+D_{RU}$, --, therefor.

Signed and Sealed this
Nineteenth Day of July, 2016

Michelle K. Lee
*Director of the United States Patent and Trademark Office*